(12) United States Patent
Liu et al.

(10) Patent No.: US 8,457,425 B2
(45) Date of Patent: Jun. 4, 2013

(54) EMBEDDED GRAPHICS CODING FOR IMAGES WITH SPARSE HISTOGRAMS

(75) Inventors: Wei Liu, San Jose, CA (US);
Mohammad Gharavi-Alkhansari, Santa Clara, CA (US)

(73) Assignee: Sony Corporation, Tokyo (JP)

( * ) Notice: Subject to any disclaimer, the term of this patent is extended or adjusted under 35 U.S.C. 154(b) by 434 days.

(21) Appl. No.: 12/795,210

(22) Filed: Jun. 7, 2010

(65) Prior Publication Data
US 2010/0310169 A1 Dec. 9, 2010

Related U.S. Application Data

(60) Provisional application No. 61/185,557, filed on Jun. 9, 2009.

(51) Int. Cl.
*G06K 9/46* (2006.01)
(52) U.S. Cl.
USPC .......................................................... 382/237
(58) Field of Classification Search
USPC .......................................................... 382/237
See application file for complete search history.

(56) References Cited

U.S. PATENT DOCUMENTS

| | | | |
|---|---|---|---|
| 4,546,385 A | | 10/1985 | Anastassiou |
| 5,850,261 A | | 12/1998 | Kondo |
| 5,903,676 A | | 5/1999 | Wu et al. |
| 6,052,205 A | * | 4/2000 | Matsuura ................. 358/426.12 |
| 6,091,777 A | | 7/2000 | Guetz et al. |
| 6,256,415 B1 | | 7/2001 | Ratnakar |
| 6,272,180 B1 | | 8/2001 | Lei |
| 6,501,397 B1 | | 12/2002 | Radha et al. |
| 6,567,081 B1 | | 5/2003 | Li et al. |
| 6,614,939 B1 | * | 9/2003 | Yamauchi ..................... 382/240 |
| 6,909,811 B1 | | 6/2005 | Kajiwara et al. |

(Continued)

FOREIGN PATENT DOCUMENTS

| | | |
|---|---|---|
| EP | 2081155 A1 | 7/2009 |
| KR | 1020020026242 A | 4/2002 |
| KR | 1020060045712 | 5/2006 |
| WO | 0049571 A2 | 8/2000 |

OTHER PUBLICATIONS

Golchin, F. et al., "A lossless image coder with context classification, adaptiveprediction and adaptive entropy coding", Acoustics, Speech and Signal Processing, 1998. Proceedings of the 1998 IEEE International Conference, May 12-15, 1998, vol. 5, pp. 2545-2548.

(Continued)

*Primary Examiner* — Jingge Wu
(74) *Attorney, Agent, or Firm* — Haverstock & Owens LLP

(57) ABSTRACT

Processes for compressing images with sparse histograms are disclosed. The image is divided into blocks, and a bit budget is assigned for each block. The pixels of a block are converted and coded bit-plane by bit-plane, starting from the Most Significant Bit (MSB) and going towards the Least Significant Bit (LSB). The pixels of the block are partitioned into groups. Each group contains pixels that have same value. Moving from the MSB to the LSB, the groups in each bit-plane are processed. When processing a group, the encoder sends a "0" if all group members have same bit value at the current bit-plane being processed, followed by the bit value; otherwise, the encoder sends a "1", followed by refinement bits for each pixel of the group, and the encoder splits the group.

22 Claims, 9 Drawing Sheets

U.S. PATENT DOCUMENTS

| | | | |
|---|---|---|---|
| 6,983,075 | B2 | 1/2006 | Schwartz |
| 7,085,424 | B2 | 8/2006 | Kajiki et al. |
| 7,194,140 | B2 | 3/2007 | Ito et al. |
| 7,321,697 | B2 | 1/2008 | Sudharsanan et al. |
| 7,356,191 | B2 | 4/2008 | Hosaka |
| 7,505,624 | B2 | 3/2009 | Ogden et al. |
| 7,567,719 | B2 | 7/2009 | Kalevo et al. |
| 7,689,051 | B2 | 3/2010 | Mukerjee |
| 7,742,645 | B2 | 6/2010 | Nakamura |
| 8,170,357 | B2 | 5/2012 | Kim et al. |
| 8,213,729 | B2 | 7/2012 | Kajiwara |
| 2002/0003905 | A1* | 1/2002 | Sato et al. .................. 382/240 |
| 2003/0016753 | A1 | 1/2003 | Kim et al. |
| 2003/0035476 | A1* | 2/2003 | Ohyama et al. ............ 375/240.1 |
| 2003/0229822 | A1 | 12/2003 | Kim et al. |
| 2004/0213472 | A1* | 10/2004 | Kodama et al. ............... 382/239 |
| 2005/0001928 | A1 | 1/2005 | Takagi |
| 2005/0058207 | A1 | 3/2005 | Magee et al. |
| 2005/0152605 | A1* | 7/2005 | Hoogendijk ................. 382/232 |
| 2005/0195897 | A1 | 9/2005 | Cha |
| 2005/0226325 | A1 | 10/2005 | Dei et al. |
| 2005/0265459 | A1 | 12/2005 | Bhattacharjya et al. |
| 2005/0276493 | A1 | 12/2005 | Xin et al. |
| 2006/0044576 | A1* | 3/2006 | Tabata et al. .................. 358/1.9 |
| 2006/0072838 | A1* | 4/2006 | Chui et al. ..................... 382/232 |
| 2006/0133494 | A1 | 6/2006 | Saxena et al. |
| 2007/0217695 | A1 | 9/2007 | Nakamura |
| 2008/0043846 | A1 | 2/2008 | Yokoyama |
| 2008/0101464 | A1* | 5/2008 | Lei ............................ 375/240.03 |
| 2008/0159640 | A1* | 7/2008 | Liu et al. ....................... 382/239 |
| 2008/0240584 | A1* | 10/2008 | Saiga et al. ................... 382/232 |
| 2008/0297620 | A1 | 12/2008 | Goel |
| 2009/0202164 | A1 | 8/2009 | Rossato et al. |
| 2009/0214128 | A1* | 8/2009 | Chen ............................ 382/246 |
| 2009/0245384 | A1 | 10/2009 | Fukuhara et al. |
| 2010/0002943 | A1* | 1/2010 | Moon et al. ................... 382/233 |
| 2011/0033126 | A1* | 2/2011 | Liu et al. ....................... 382/238 |
| 2011/0033127 | A1 | 2/2011 | Rasmusson et al. |

OTHER PUBLICATIONS

Wu, X. et al., "Context-based, adaptive, lossless image coding", Communications, IEEE Transactions, Apr. 1, 1997, vol. 45, Issue 4, pp. 437-444.

Tan and Zakhor, "Real-Time Internet Video Using Error Resilient Scalable Compression and TCP-Friendly Transport Protocol." IEEE Transactions on Multimedia, vol. 1, No. 2, Jun. 1999.

Van der Schaar and Radha, "Unequal Packet Loss Resilience for Fine-Granular-Scalability Video," IEEE Transactions on Multimedia, vol. 3, No. 4, Dec. 2001.

* cited by examiner

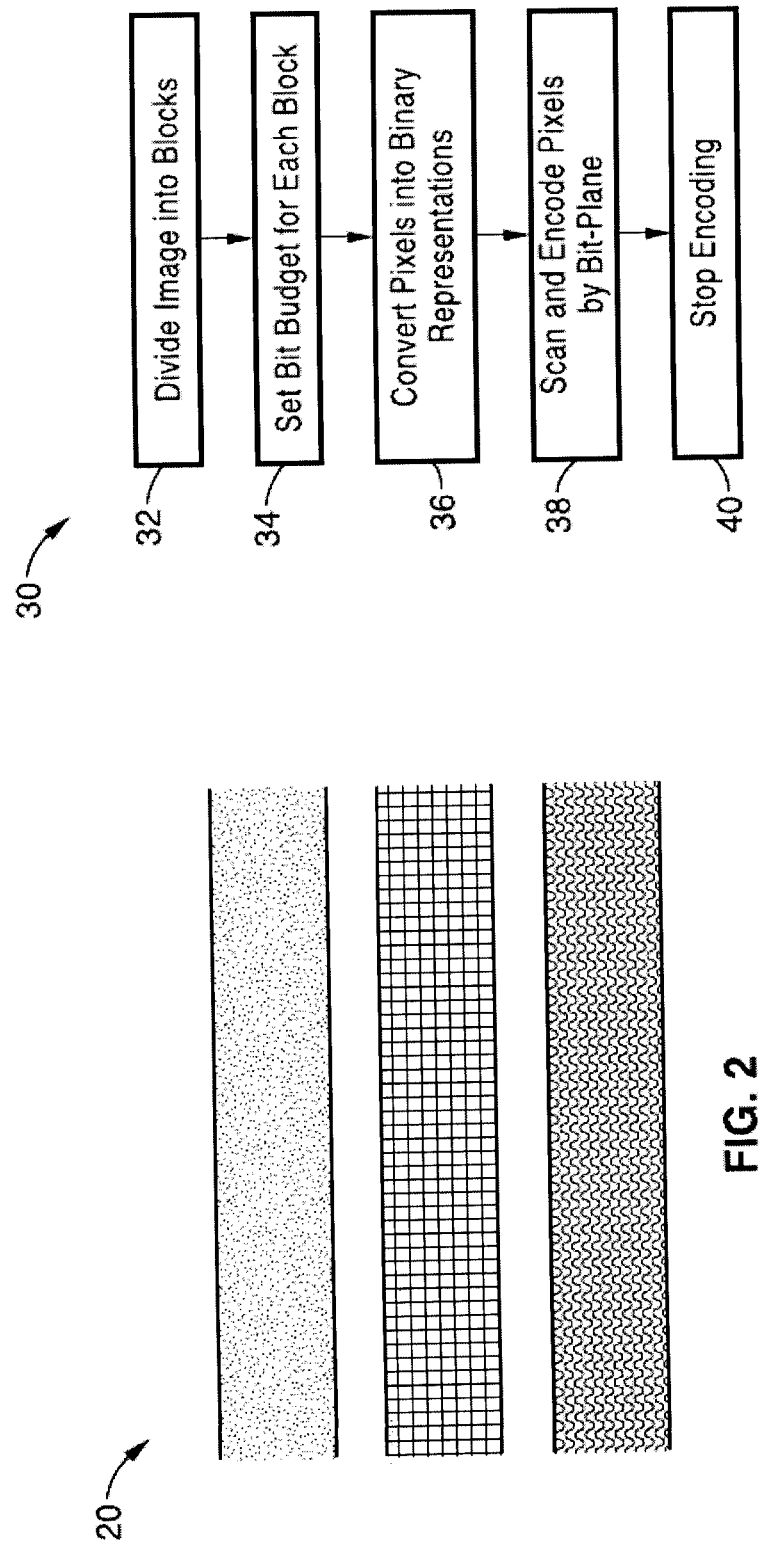

EMBEDDED GRAPHICS CODING FOR IMAGES WITH SPARSE HISTOGRAMS

CROSS-REFERENCE TO RELATED APPLICATIONS

This application claims priority from U.S. Provisional Application Ser. No. 61/185,557, filed on Jun. 9, 2009, and entitled, "Embedded Graphics Coding for Images with Sparse Histograms," which is incorporated herein by reference in its entirety.

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

FIELD OF THE INVENTION

This invention pertains generally to data compression, and more particularly to data compression for images with sparse histograms.

BACKGROUND OF THE INVENTION

Most image compression schemes are designed for "natural images", e.g. photos taken by a digital camera. For natural images, strong correlation exists among neighboring pixels. Hence, most image compression schemes work by de-correlating the pixels using prediction/transform, or both. This results in a sparse histogram of the prediction residuals or transform coefficients. FIG. 1 illustrates histogram 12 of an image 10 after an 8×8 discrete cosine transform 16. As shown in FIG. 1, the histogram 12 has a single peak 14, which is located around 0. Quantization is applied (if necessary), and entropy coding of the (quantized) prediction residuals or transform coefficients is performed. The entropy coder is generally designed for distributions similar to those shown in FIG. 1. In other words, if the distribution has significantly different shape, the coding performance could be poor.

However, there is also a large amount of "unnatural" images in need of compression. These images often comprise graphics or text, which typically have a large dynamic range strong contrast, sharp edges, strong textures, and sparse histograms. FIG. 2 is an example of such an "unnatural image".

These types of images usually cannot be well handled by conventional image compression algorithms. Inter-pixel correlation is weaker, and prediction or transform does not provide a sparse distribution as for natural images.

One attempt to address compression of these images is called "histogram packing", where the encoder goes through the whole image, computes the histogram, and does a non-linear mapping of the pixels before compressing the image. The compression requires a two-pass processing, causing increased memory cost and more computations. The bitstream is not scalable, which means that the decoder needs the whole bitstream to decode the image. Partial reconstruction is not possible without re-encoding.

SUMMARY OF THE INVENTION

Processes for compressing images with sparse histograms are disclosed. The image is divided into blocks, and a bit budget is assigned for each block. The pixels of a block are converted and coded bit-plane by bit-plane, starting from the Most Significant Bit-plane (MSB) and going towards the Least Significant Bit-plane (LSB). The pixels of the block are partitioned into groups. Each group contains pixels that have the same value. A group is split, if pixels in the group have different values in the bit-plane being encoded. Moving from the MSB to the LSB, the groups in each bit-plane are processed. The encoder sends a "0" for a group if all members of the group have same bit value at the current bit-plane being processed, followed by the bit value. If the group members have different values, the encoder splits the group and sends a "1", followed by refinement bits for each pixel of the group.

In one aspect, a method of processing an image, comprises dividing the image into blocks using a first processor, setting a bit budget for each block, converting pixels of each block into binary representations, scanning and encoding the pixels from the most significant bit-plane to the least significant bit-plane and generating a compressed image file of the encoded pixels and saving the compressed image file to memory coupled to the first processor. The image comprises an image having a sparse histogram. Scanning and encoding the pixels at a current bit-plane comprises processing all existing groups of the block, where for each group, if the pixels all have the same value in the current bit-plane, writing a first bit of "0" into a bitstream and followed by a second bit value designating the value of all the pixels in a current group; if the pixel values do not all have the same value, writing the first bit value of "1" into the bitstream, followed by one bit for each pixel in the current group designating the bit value of that pixel in the current bit-plane, generating a new group and splitting the original group, retaining pixels with a value "0" in the original group and placing pixels with a value "1" in the new group. The method further comprises decoding the compressed image file with a second processor to uncompress the image. Decoding the compressed image file comprises processing each block from the MSB to the LSB, and processing all existing groups for each bit-plane. Processing a group at the current bit-plane comprising, reading a bit from the bitstream, if the bit has a "0" value, then reading a second bit from the bitstream and setting the value to be the bit value for all pixels in the group in a current bit-plane, if the bit has a "1" value, then for each pixel in the group, one bit is read from the bitstream and set to be the bit value of that pixel in the current bit-plane, a new group is generated and the original group is split into two so that the pixels with the "0" value are in the original group and the pixels with the "1" value are in the new group. The bit budget of each of the blocks is shared between the blocks. The first processor is within a device selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone, a video player, a DVD writer/player, a Blu-ray® writer/player, a television and a home entertainment system.

In another aspect, an apparatus for processing an image, comprises a first processor configured for processing pixels of an image and programming executable on the first processor for, dividing the image into blocks, setting a bit budget for each block, converting pixels of each block into binary representations, scanning and encoding the pixels from the most significant bit-plane to the least significant bit-plane and generating a compressed image file of the encoded pixels. The apparatus further comprises memory coupled to the first processor, wherein the compressed image file is stored within the memory. Programming is configured to scan and encode the pixels bit-plane by bit-plane, and for each bit-plane comprising processing all existing groups of the block, where for each group, if the pixel all have the same value in the current bit-plane, writing a first bit of "0" into a bitstream and followed by a second bit value designating the value of all the pixels in a current group; if the pixel values do not all have the same value, writing the first bit value of "1" into the bitstream, followed by one bit for each pixel in the current group designating the bit value of that pixel in the current bit-plane, generating a new group and splitting the original group, retaining pixels with a value "0" in the original group and placing pixels with a value "1" in the new group. The apparatus further comprises: second programming executing on the first processor or a second processor and the second programming configured to decode the compressed image file to uncompress the image. The decoder is further configured for processing each block from the MSB to the LSB, and processing all existing groups for each bit-plane. Processing a group at the current bit-plane comprising, reading a bit from the bitstream, if the bit has a "0" value, then reading a second bit from the bitstream and setting the value to be the bit value for all pixels in the group in a current bit-plane, if the bit has a "1" value, then for each pixel in the group, one bit is read from the bitstream and set to be the bit value of that pixel in the current bit-plane, a new group is generated and the original group is split into two so that the pixels with the "0" value are in the original group and the pixels with the "1" value are in the new group. The bit budget of each of the blocks is shared between the blocks. The apparatus is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone, a video player, a DVD writer/player, a Blu-ray® writer/player, a television and a home entertainment system.

In yet another aspect, an apparatus for processing an image with a sparse histogram, comprises first processing means configured for processing pixels of the image, encoding means executable on the first processing means for dividing the image into blocks, setting a bit budget for each block, converting pixels of each block into binary representations, scanning and encoding the pixels from the most significant bit-plane to the least significant bit-plane and generating a compressed image file of the encoded pixels and storage means coupled to the first processing means, wherein the compressed image file is stored within the storage means. Encoding means is configured to scan and encode the pixels bit-plane by bit-plane, and at the current bit-plane it comprises processing all existing groups of the block, where for each group, if the pixel all have the same value in the current bit-plane, writing a first bit of "0" into a bitstream and followed by a second bit value designating the value of all the pixels in a current group; if the pixel values do not all have the same value, writing the first bit value of "1" into the bitstream, followed by one bit for each pixel in the current group designating the bit value of that pixel in the current bit-plane, generating a new group and splitting the original group, retaining pixels with a value "0" in the original group and placing pixels with a value "1" in the new group. The apparatus further comprises decoding means executable on the first processing means or a second processing means coupled to the first processing means and the decoding means configured to decode the compressed image file to uncompress the image. The decoding means comprises a decoder configured to decode the compressed image file by processing each block from the MSB to the LSB, and processing all existing groups for each bit-plane. Processing a group at the current bit-plane comprising, reading a bit from the bitstream, if the bit has a "0" value, then reading a second bit from the bitstream and setting the value to be the bit value for all pixels in the group in a current bit-plane, if the bit has a "1" value, then for each pixel in the group, one bit is read from the bitstream and set to be the bit value of that pixel in the current bit-plane, a new group is generated and the original group is split into two so that the pixels with the "0" value are in the original group and the pixels with the "1" value are in the new group. The bit budget of each of the blocks is shared between the blocks. The apparatus is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone, a video player, a DVD writer/player, a Blu-ray® writer/player, a television and a home entertainment system.

In another aspect, an apparatus for processing an image with a sparse histogram, comprises a first processor for processing pixels of the image, an encoder executable on the first processor for dividing the image into blocks, setting a bit budget for each block, converting pixels of each block into binary representations, scanning and encoding the pixels from the most significant bit-plane to the least significant bit-plane and generating a compressed image file of the encoded pixels and a storage device coupled to the first processing device, wherein the compressed image file is stored within the storage device. The encoder is configured to scan and encode bit-plane by bit-plane, and at the current bit-plane the encoding comprises processing all existing groups of the block, where for each group, if the pixel all have the same value in the current bit-plane, writing a first bit of "0" into a bitstream and followed by a second bit value designating the value of all the pixels in a current group; if the pixel values do not all have the same value, writing the first bit value of "1" into the bitstream, followed by one bit for each pixel in the current group designating the bit value of that pixel in the current bit-plane, generating a new group and splitting the original group, retaining pixels with a value "0" in the original group and placing pixels with a value "1" in the new group. The apparatus further comprises a decoder executable on the first processing means or a second processing means coupled to the first processing means and the decoder configured to decode the compressed image file to uncompress the image. The decoder is configured to decode the compressed image file by processing each block from the MSB to the LSB, and processing all existing groups for each bit-plane. Processing a group at the current bit-plane comprising, reading a bit from the bitstream, if the bit has a "0" value, then reading a second bit from the bitstream and setting the value to be the bit value for all pixels in the group in a current bit-plane, if the bit has a "1" value, then for each pixel in the group, one bit is read from the bitstream and set to be the bit value of that pixel in the current bit-plane, a new group is generated and the original group is split into two so that the pixels with the "0" value are in the original group and the pixels with the "1" value are in the new group. The bit budget of each of the blocks is shared between the blocks. The apparatus is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone, a video player, a DVD writer/player, a Blu-ray® writer/player, a television and a home entertainment system.

In another aspect, a network of devices comprises an encoder device for encoding an image comprises dividing the image into blocks, setting a bit budget for each block, converting pixels of each block into binary representations, scanning and encoding the pixels from the most significant bit-plane to the least significant bit-plane and generating a compressed image file of the encoded pixels and a decoder device for decoding the compressed image file comprises by processing each block from the MSB to the LSB, and processing all existing groups for each bit-plane. Processing a group at the current bit-plane comprising, reading a bit from the bitstream, if the bit has a "0" value, then reading a second bit from the bitstream and setting the value to be the bit value for all pixels in the group in a current bit-plane, if the bit has a "1" value, then for each pixel in the group, one bit is read from the bitstream and set to be the bit value of that pixel in the current bit-plane, a new group is generated and the original group is split into two so that the pixels with the "0" value are in the original group and the pixels with the "1" value are in the new group. The encoder device is configured to scan and encode the pixels bit-plane by bit-plane, and at the current bit-plane the encoding comprises processing all existing groups of the block, where for each group, if the pixel all have the same value in the current bit-plane, writing a first bit of "0" into a bitstream and followed by a second bit value designating the value of all the pixels in a current group; if the pixel values do not all have the same value, writing the first bit value of "1" into the bitstream, followed by one bit for each pixel in the current group designating the bit value of that pixel in the current bit-plane, generating a new group and splitting the original group, retaining pixels with a value "0" in the original group and placing pixels with a value "1" in the new group. The bit budget of each of the blocks is shared between the blocks.

In some embodiments, multiple blocks are able to share their bit budget with each other, such that more bits are able to be allocated to blocks that are difficult to encode. This is to improve overall coding performance. In one extreme case, one bit budget is shared by all blocks in an image. In another extreme case, each block has its own bit budget. Any variation of bit budgets between one bit budget for all blocks and each block having a bit budget is possible.

BRIEF DESCRIPTION OF THE DRAWINGS

FIG. 2 illustrates a typical graphics image.

FIG. 3 illustrates a schematic diagram of method for encoding a graphics image in accordance with some embodiments.

DETAILED DESCRIPTION OF THE PREFERRED EMBODIMENT

Referring more specifically to the drawings, for illustrative purposes the embedded graphics coding for images with sparse histograms is embodied in the apparatus generally shown in the non-prior art figures. It will be appreciated that the apparatus is able to vary as to configuration and as to details of the parts, and that the method is able to vary as to the specific steps and sequence, without departing from the basic concepts as disclosed herein.

The embedded graphics coding for images with sparse histograms includes a coding algorithm and systems and methods to encode images having sparse histograms, e.g. typically for (but not limited to) graphical or textual images.

The algorithm, systems and methods use a new process called Embedded Graphics Coding (EGC), which provides lossy to lossless scalability, wherein even if the decoding is stopped in the middle of the bitstream, the decoder is able to still make a reasonable decoded block based on the bits it has received. If the entire bitstream is sent, the image is able to be losslessly reconstructed.

The algorithm, systems and methods described herein have low complexity, and high coding performance.

FIG. 3 illustrates a flow diagram of the process 30 of encoding an image with a sparse histogram. First the image is divided into blocks at step 32. Next, a bit budget is set for each block at step 34. The bit budget is generally agreed upon by both the encoder and the decoder. The encoder and decoder are able to be configured such that the bit budget is able to be dynamically changed if the bandwidth is time-varying. The coded bitstream is fully embedded, so the bit budget is able to be changed arbitrarily.

For each block, the pixels of the image are converted into binary representations at step 36. It is to be noted that the encoder need not perform any prediction or transform, because it is assumed the pixels already have a sparse histogram. The lack of prediction or transform cuts back on computations and required processing power.

Next, at step 38, the pixels for each block are scanned and encoded bit-plane by bit-plane. A bit-plane of a digital image is a set of bits having the same position in the respective binary numbers. For example, for 8-bit data representation there are 8 bit-planes. The first bit-plane contains the set of the most significant bit and the 8th contains the least significant bit. The most significant bit-plane (MSB) is scanned and encoded first, progressing to the next-most significant bit-plane, until the least significant bit-plane (LSB) is scanned. The encoding process of each bit-plane is described in detail below.

At step 40, the encoding is stopped. Encoding is generally stopped if one of two conditions occurs: 1) the bit budget of the current block is depleted, or 2) if the reconstructed block has reached the end of LSB. In this case, the decoder has also determined the end of a block.

Figure 1:
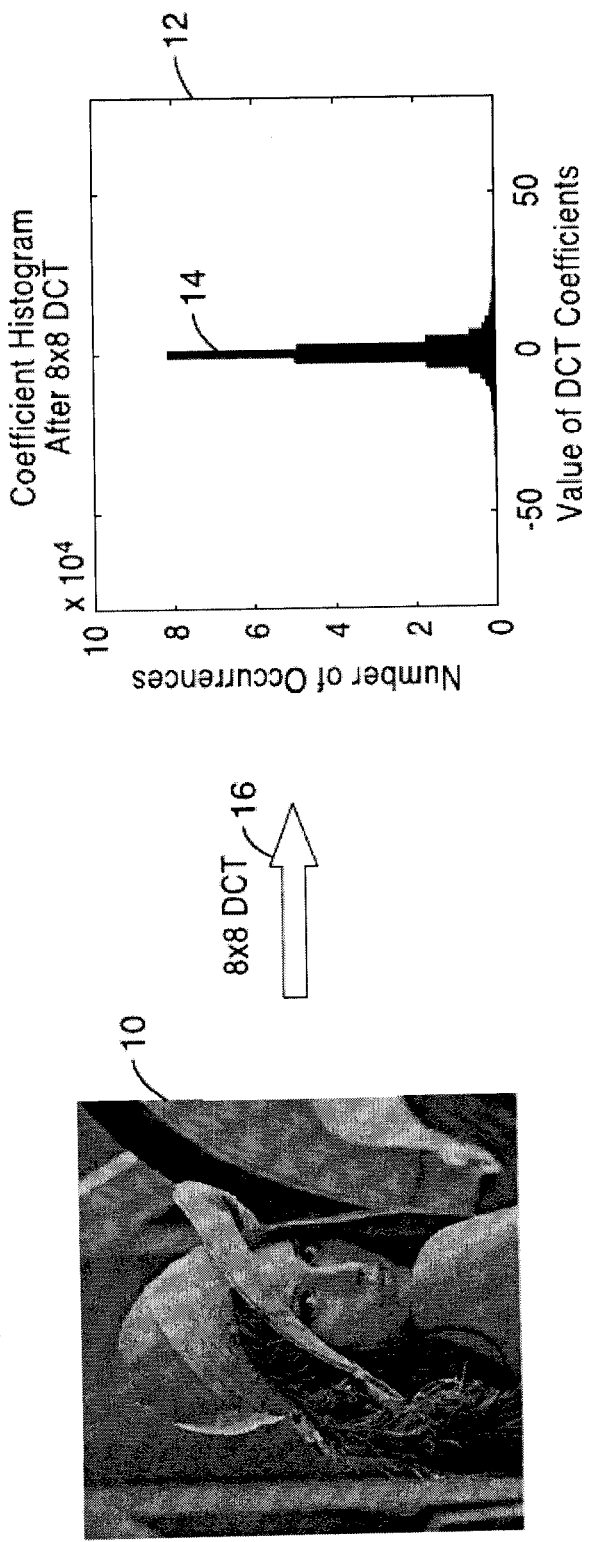
FIG. 1 illustrates a schematic diagram of prior art discrete cosine transform of an image and corresponding histogram.
Figure 4:
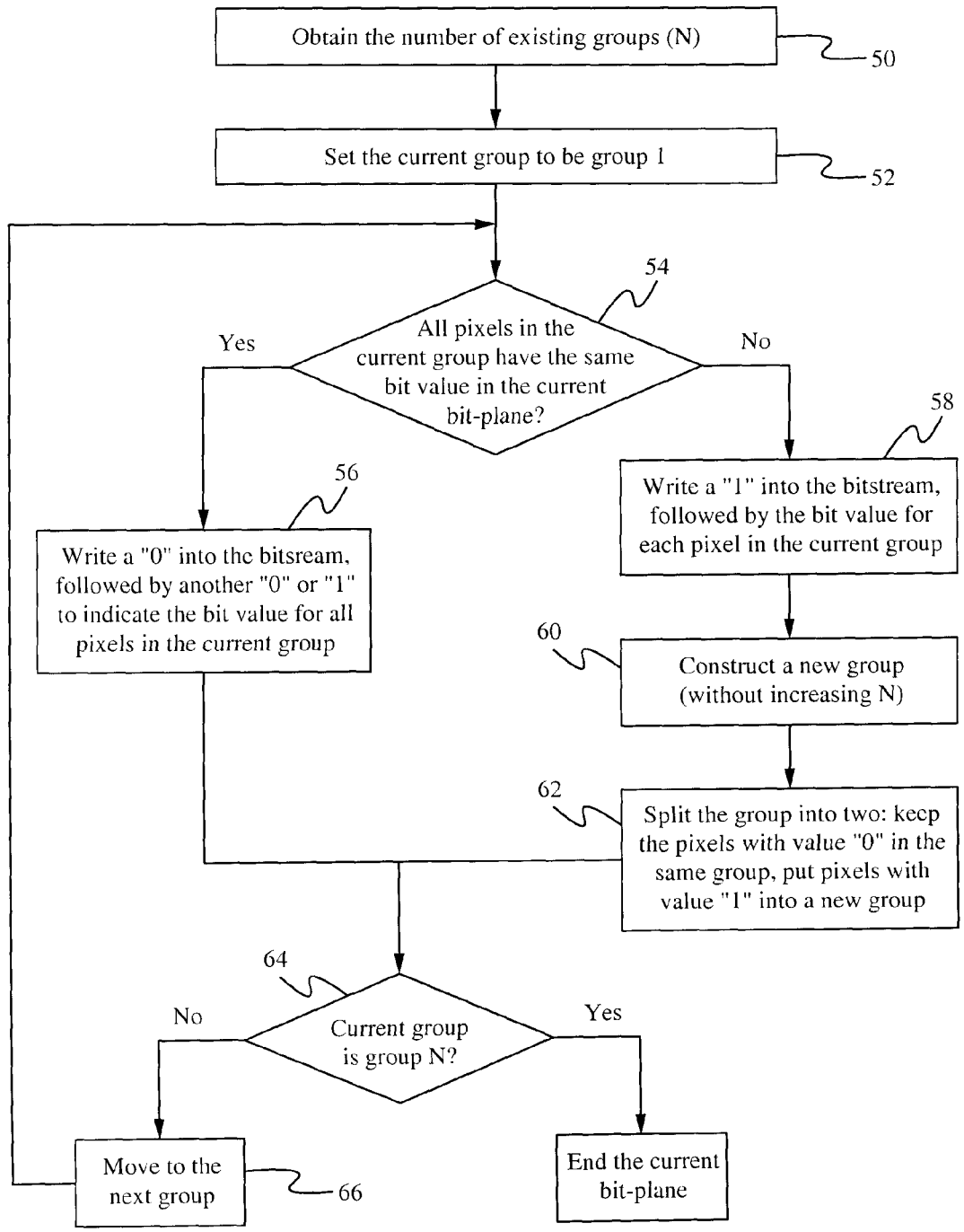
FIG. 4 illustrates a schematic diagram of EGC encoding for a bit-plane in a block according to some embodiments.

FIG. 4 illustrates a schematic diagram of EGC encoding for a bit-plane in a block according to some embodiments. In the step 50, the number of existing groups (N) is obtained. In the step 52, the current group is set to be group 1. In the step 54, the algorithm evaluates whether the pixels in the current group have the same bit value in the current bit-plane.

If all the pixels in the group have the same bit value, a "0" is written into the bitstream followed by another "0" or "1" to indicate the bit value for all pixels in the current group, in the step 56.

If the pixels in the group do not have the same bit value, a "1" is written into the bitstream, followed by the bit value for each pixel in the current group, in the step 58. In the step 60, a new group is generated without increasing N. In the step 62, the group is split into two where the pixels with value "0" are kept in the same group and pixels with the value "1" are put into the new group.

In the step 64, the encoder evaluates whether the current group is group N. If the current group is not group N, then the process goes to the next group, in the step 66, and the process resumes in the step 54. If the current group is group N, then encoding the current bit-plane ends.

Figure 5:
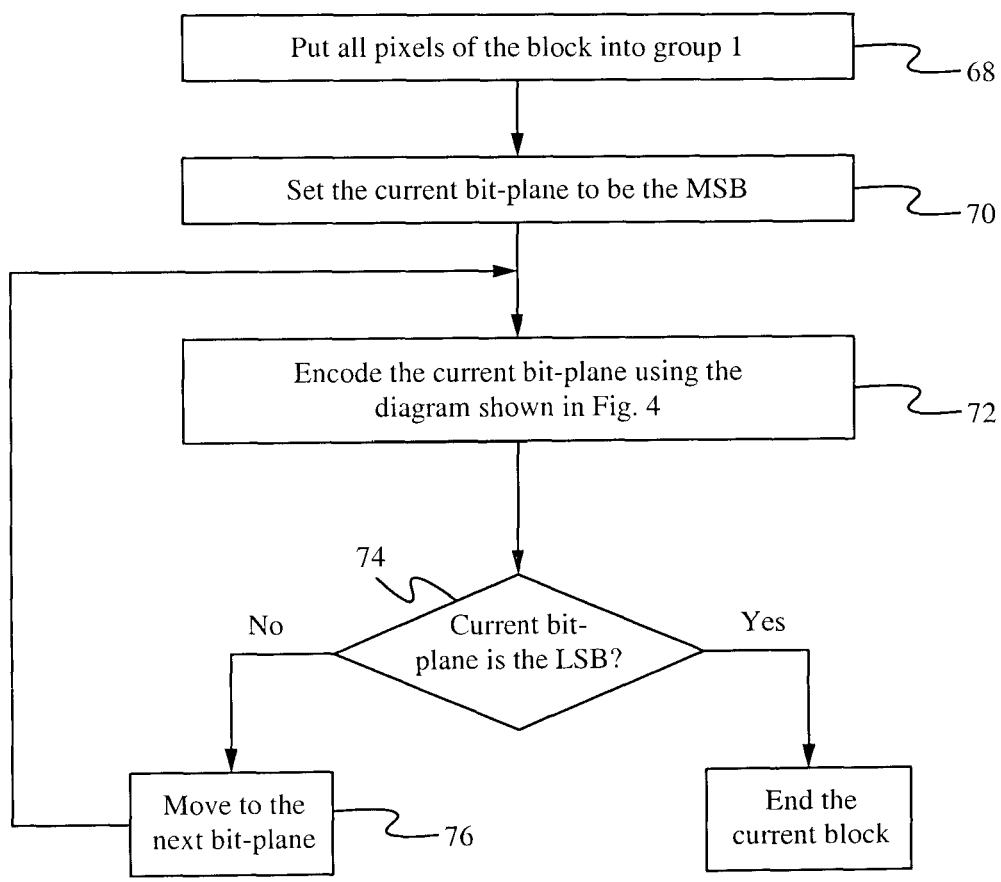
FIG. 5 illustrates a schematic diagram of EGC encoding for a block according to some embodiments.

FIG. 5 illustrates a schematic diagram of EGC encoding for a block according to some embodiments. In the step 68, all of the pixels of the block are placed in group 1. In the step 70, the current bit-plane is set to be the MSB. In the step 72, the current bit-plane is encoded using the method described in FIG. 4. In the step 74, it is determined if the current bit-plane is the LSB. If the current bit-plane is not the LSB, then the process moves to the next bit-plane, in the step 76, and the process resumes in the step 72. If the current bit-plane is the LSB, then encoding the current block stops.

Figure 6:
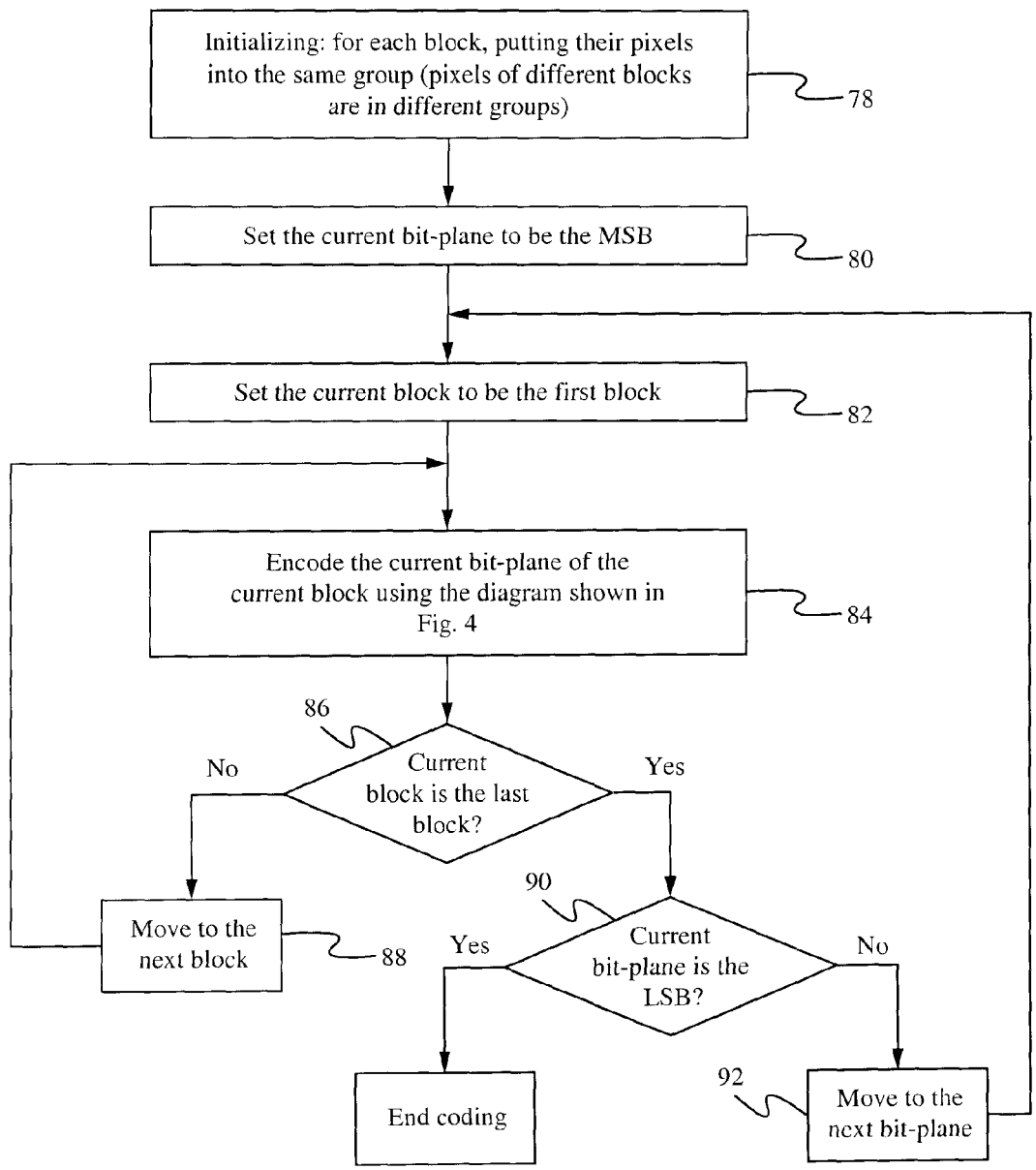
FIG. 6 illustrates a schematic diagram of EGC encoding of multiple blocks that share the bit budget according to some embodiments.

FIG. 6 illustrates a schematic diagram of EGC encoding of multiple blocks that share the bit budget according to some embodiments. In the step 78, the pixels of each block are put into a same group for each block (pixels of different blocks are in different groups). In the step 80, the current bit-plane is set to be the MSB. In the step 82, the current block is set to be the first block. In the step 84, the current bit-plane of the current block is encoded using the method of FIG. 4. In the step 86, it is determined if the current block is the last block. If the current block is not the last block, then the process moves to the next block in the step 88, and the process resumes at the step 84. If the current block is the last block, then it is determined if the current bit-plane is the LSB, in the step 90. If the current bit-plane is the LSB, then the encoding ends. If the current bit-plane is not the LSB, then the process moves to the next bit-plane in the step 92, and the process resumes at the step 82.

Figure 7:
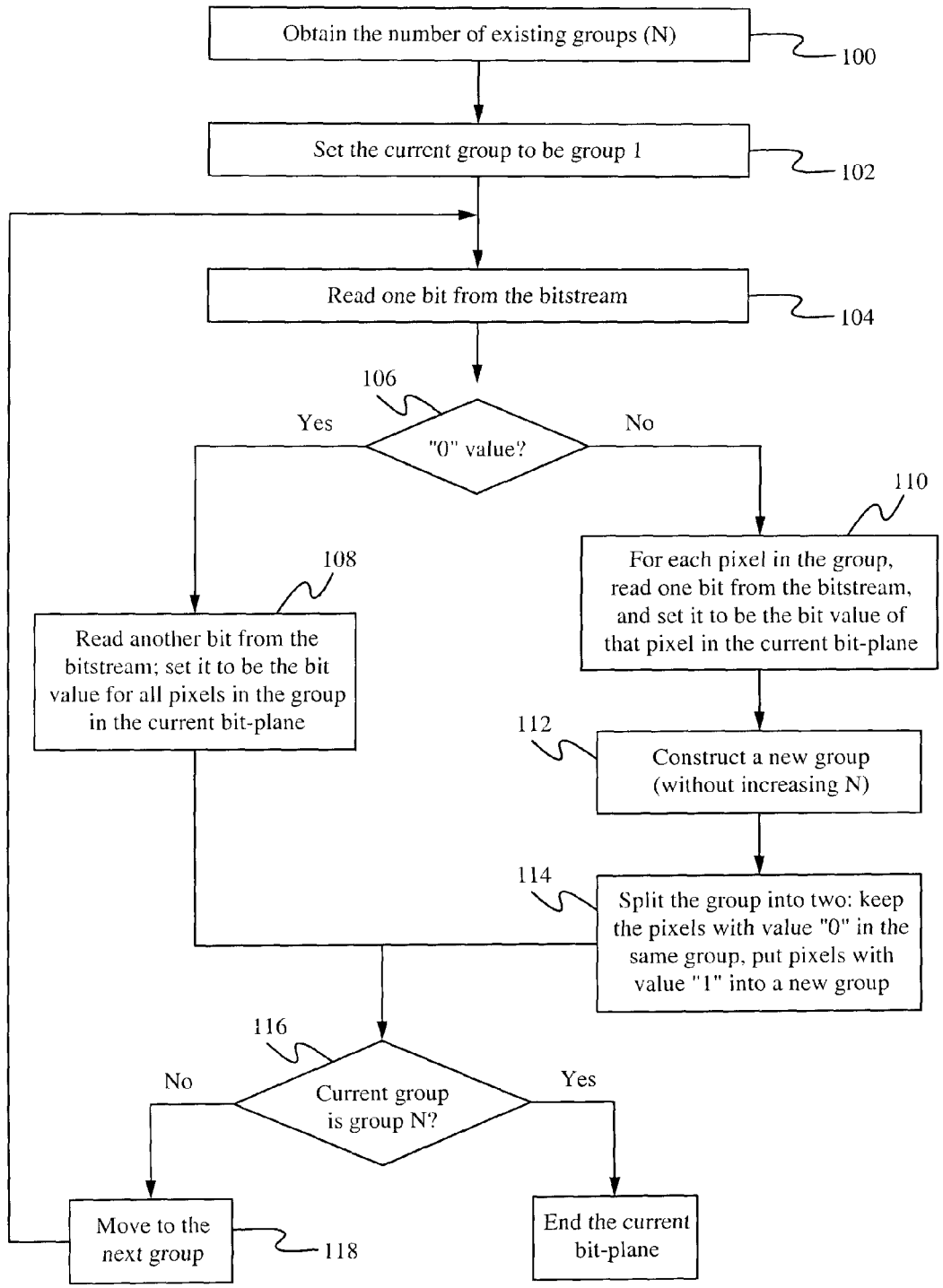
FIG. 7 illustrates a schematic diagram of EGC decoding for a bit-plane in a block according to some embodiments.

FIG. 7 illustrates a schematic diagram of EGC decoding for a bit-plane in a block according to some embodiments. In the step 100, the number of existing groups (N) is obtained. In the step 102, the current group is set to be group 1. In the step 104, a bit is read from the bitstream. In the step 106, it is determined if the bit contains a value of "0." If the value is "0," then another bit is read from the bitstream and that bit value is set for all pixels in the group in the current bit-plane, in the step 108. For example, if the second bit read is a "1," then all bits are set as a "1." If the bit value is not "0," then a bit is read from the bitstream for each pixel in the group, and the bit is set to be the bit value of that pixel in the current bit-plane, in the step 110. In the step 112, a new group is generated without increasing N. In the step 114, the group is split, where the pixels with value "0" are kept in the same group, and the pixels with value "1" are put into the new group. In the step 116, it is determined if the current group is group N. If the current group is not group N, then the process moves to the next group in the step 118. If the current group is group N, then the current bit-plane decoding ends.

Figure 8:
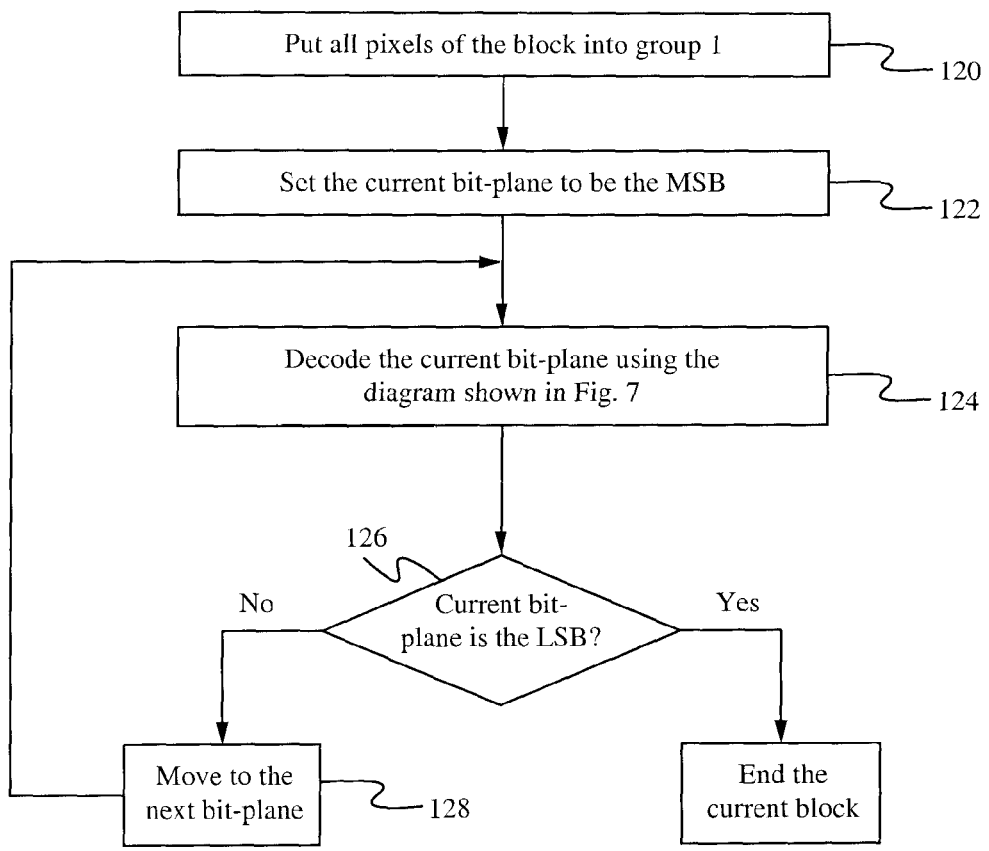
FIG. 8 illustrates a schematic diagram of EGC decoding for a single block according to some embodiments.

FIG. 8 illustrates a schematic diagram of EGC decoding for a single block according to some embodiments. In the step 120, all of the pixels of the block are placed in group 1. In the step 122, the current bit-plane is set to be the MSB. In the step 124, the current bit-plane is decoded using the method described in FIG. 7. In the step 126, it is determined if the current bit-plane is the LSB. If the current bit-plane is not the LSB, then the process moves to the next bit-plane, in the step 128, and the process resumes in the step 124. If the current bit-plane is the LSB, then decoding the current block stops.

Figure 9:
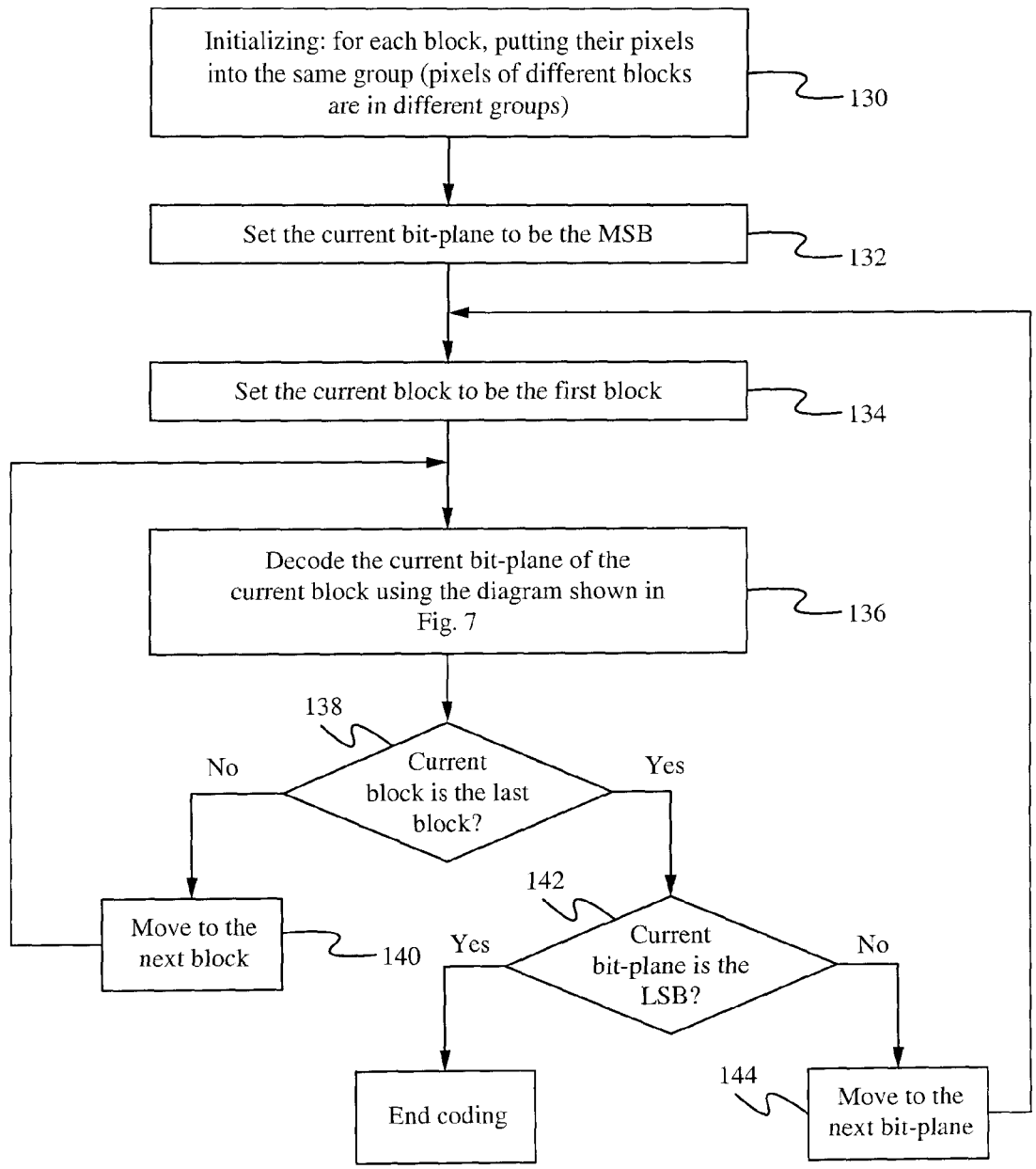
FIG. 9 illustrates a schematic diagram of EGC decoding of multiple blocks that share the bit budget according to some embodiments.

FIG. 9 illustrates a schematic diagram of EGC decoding of multiple blocks that share the bit budget according to some embodiments. In the step 130, the pixels of each block are put into a same group for each block (pixels of different blocks are in different groups). In the step 132, the current bit-plane is set to be the MSB. In the step 134, the current block is set to be the first block. In the step 136, the current bit-plane of the current block is decoded using the method of FIG. 7. In the step 138, it is determined if the current block is the last block. If the current block is not the last block, then the process moves to the next block in the step 140, and the process resumes at the step 136. If the current block is the last block, then it is determined if the current bit-plane is the LSB, in the step 142. If the current bit-plane is the LSB, then the encoding ends. If the current bit-plane is not the LSB, then the process moves to the next bit-plane in the step 144, and the process resumes at the step 134.

In some embodiments, multiple blocks are able to share their bit budget with each other, such that more bits are able to be allocated to blocks that are difficult to encode. This is to improve overall coding performance. In one extreme case, one bit budget is shared by all blocks in an image. In another extreme case, each block has its own bit budget. Any variation of bit budgets between one bit budget for all blocks and each block having a bit budget is possible.

In some cases, the algorithm performs pixel reconstruction of a partially recovered image. If a pixel has had its LSB decoded, the decoder knows the true value of the pixel. If the decoding of a pixel stops somewhere in the middle, then the decoder only knows a range of values in which the pixel value is in.

For example, if the first 5 bit-planes of a pixel is decoded as 10110, and there are still 3 bit-planes remaining unknown to the decoder, then the true pixel value is in the range 10110000~10110111 (in binary representation). In this case, the decoder chooses the close to mid-point reconstruction and sets the unknown bits to be 100 . . . 0. In the example above, the reconstruction value would be 10110100.

Figure 10:
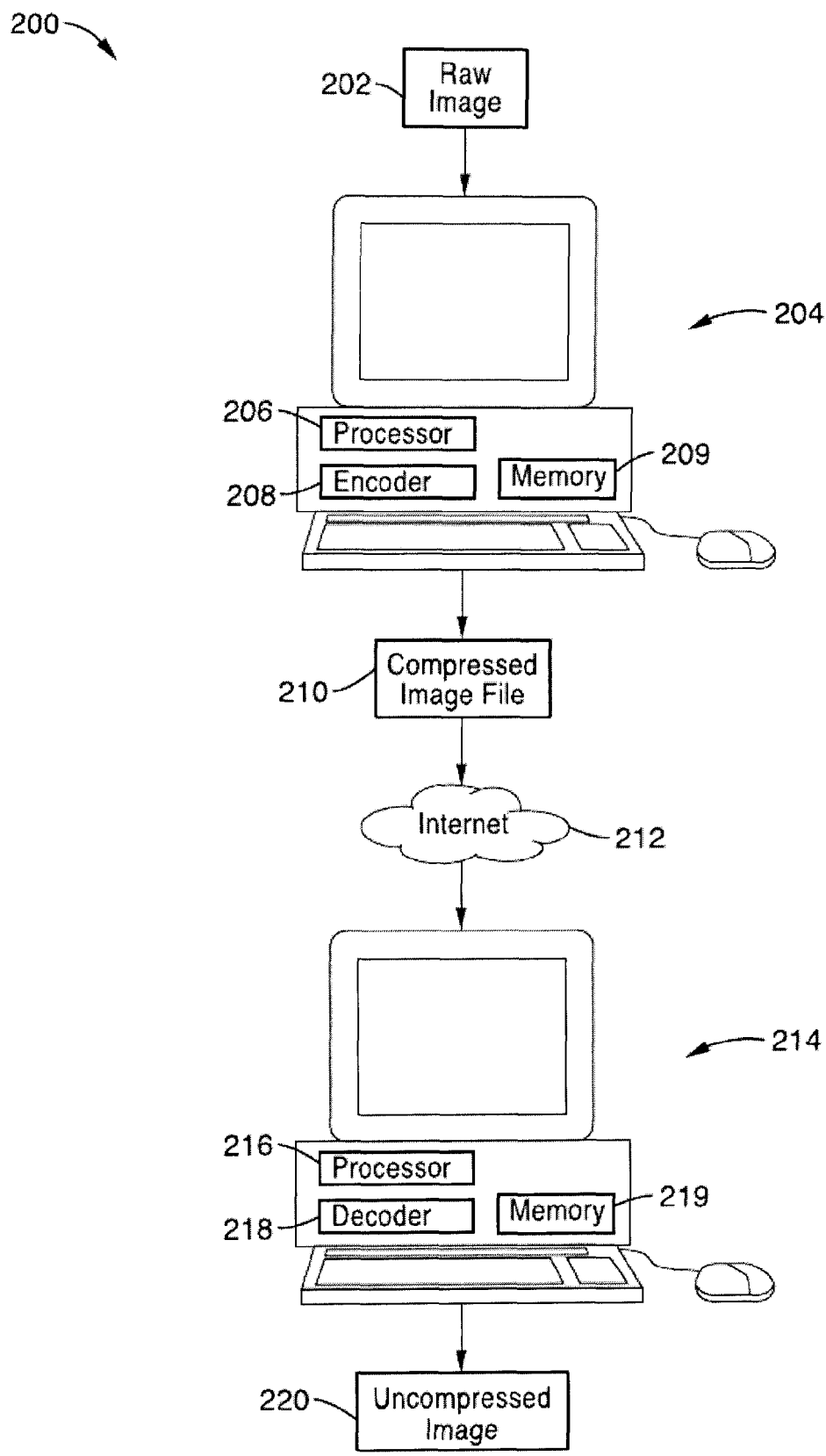
FIG. 10 illustrates a schematic diagram of a system for encoding and decoding a graphics image using EGC in accordance with some embodiments.

FIG. 10 illustrates an exemplary system 200 for encoding and decoding a graphics image with a sparse histogram in accordance with some embodiments. The raw image 202 is processed by the first device 204 having a processor 206 and encoder 208 in accordance with some embodiments. The devices 204, 214 are able to be a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone, a video player, a DVD writer/player, a Blu-ray® writer/player, a television, a home entertainment system or other device with a processor 206 and memory or other storage means 209 for storing encoding module 208. The raw image is able to then be encoded using encoder 208 comprising programming/encoding means to form a compressed image file 210 (e.g. via the algorithms/processes described above). This is able to be sent over the internet 212 or like network to a second device 214. Second device 214 comprises a processor 216, memory or storage means 219 and decoding module 218 that comprises programming/decoding means configured to read the compressed data file 210 and decodes it in accordance with the methods described herein (e.g. via the algorithms/processes described above) to generate the uncompressed image 220. It is appreciated that both devices are able to include both the encoding module 208 and decoding module 218, and likewise perform both encoding and decoding operations.

EXAMPLE 1

In an exemplary 8-bit image, half of the pixels are zeros, and the other pixels have the value of 255. The locations of 0s and 255s are random. Theoretically, at least 1 bit per pixel is needed for lossless compression. Conventional image coding algorithms cannot provide lossless compression close to 1 bit per pixel (except for histogram packing).

In the embedded graphics coding algorithm (e.g. encoding algorithm 38), a "1" is sent in the MSB to indicate an original group that was split into two groups, and 1 bit per pixel to send the bit values of each pixel at the MSB. Otherwise, a "0" is sent to indicate that all the pixels in the group are the same.

For the following bit-planes, a "00" is sent for the group of 0s, and "01" is sent for the group of 255s.

The total bits for lossless compression of a block is $$1+n+4\times 7=n+29$$

where n is the pixel number of a block.

The average bit rate is (1+29/n) bit per pixel, which is close to the theoretical limit for reasonable block sizes (e.g., when n=8×8=64).

The encoding algorithm is able to also be constructed so that if a group has only 1 or 2 members, it does not send the 1-bit "split-or-not" signal, and the refinement bit(s) are sent directly.

Also, the order of the bit-stream is able to be re-arranged for better embeddedness. If a group is split, the sending of its refinement bits is delayed, and the algorithm moves forward to process the next group. It is possible that the next group is not split, and thus one bit is able to be used to represent multiple bits. Also, if the bit-stream is stopped in the middle of a bit-plane, this approach provides better reconstruction quality.

There could be some visual artifacts if the refining of a group is stopped in the middle of the group. To avoid this problem, the decoder is able to be configured to withdraw refining of a group if some of the refinement bits for the current group are not received.

In another alternative embodiment, instead of sending the "split-or-not" bit and the refinement bits as raw bits, the bits are able to also be coded using run-length coding or binary arithmetic coding to further improve coding efficiency.

The embedded graphics coding methods are also suitable as a supplement to conventional image coding. The embedded graphics coding is able to be combined with any block-based image coding algorithms. In such case, 1 bit in the bit-stream is used to tell the decoder whether EGC is used.

Embodiments are described with reference to flowchart illustrations of methods and systems according to some embodiments. These methods and systems are also able to be implemented as computer program products. In this regard, each block or step of a flowchart, and combinations of blocks (and/or steps) in a flowchart, are able to be implemented by various means, such as hardware, firmware, and/or software including one or more computer program instructions embodied in computer-readable program code logic. As will be appreciated, any such computer program instructions are able to be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts support combinations of means for performing the specified functions, combinations of steps for performing the specified functions, and computer program instructions, such as embodied in computer-readable program code logic means, for performing the specified functions. It will also be understood that each block of the flowchart illustrations, and combinations of blocks in the flowchart illustrations, are able to be implemented by special purpose hardware-based computer systems which perform the specified functions or steps, or combinations of special purpose hardware and computer-readable program code logic means.

Furthermore, these computer program instructions, such as embodied in computer-readable program code logic, are able to also be stored in a computer-readable memory that is able to direct a computer or other programmable processing apparatus to function in a particular manner, such that the instructions stored in the computer-readable memory produce an article of manufacture including instruction means which implement the function specified in the block(s) of the flowchart(s). The computer program instructions are able to also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s).

To utilize EGC for images with sparse histograms, a user acquires a video/image such as on a digital camcorder, and while or after the video is acquired, or when sending the video to another device such as a computer, the EGC method automatically encodes each image of the video, so that the video is encoded appropriately to maintain a high quality video. The EGC method occurs automatically without user involvement. The video is also able to be decoded to be displayed using a similar method.

In operation, the EGC method is used to encode and transmit images such as frames of a video. Each image block is processed from the MSB to the LSB, hence the resulting bit-plane is still embedded. The improved encoding method is able to be used in any implementation including, but not limited to, wireless high definition (WiHD).

The EGC for images with sparse histograms method described herein is able to be used with videos and/or images, including high definition videos.

High definition video is able to be in any format including but not limited to HDCAM, HDCAM-SR, DVCPRO HD, D5 HD, XDCAM HD, HDV and AVCHD.

Some Embodiments of Embedded Graphics Coding for Images with Sparse Histograms

1. A method of processing an image, comprising:
 a. dividing the image into blocks using a first processor;
 b. setting a bit budget for each block;
 c. converting pixels of each block into binary representations;

d. scanning and encoding the pixels from the most significant bit-plane to the least significant bit-plane; and
e. generating a compressed image file of the encoded pixels and saving the compressed image file to memory coupled to the first processor.

2. The method as recited in clause 1, wherein the image comprises an image having a sparse histogram.
3. The method as recited in clause 1, wherein scanning and encoding the pixels at each bit-plane comprises processing each existing group in the bit-plane, which further comprises:
   a. if the pixel values of the group all have the same value at the current bit-plane, writing a first bit value of "0" into a bitstream; and
   b. writing a second bit value into the bitstream designating the value of all the pixels in a current group.
4. The method as recited in clause 3, further comprising:
   a. if the pixel values of the group do not all have the same value at the current bit-plane, writing the first bit value of "1" into the bitstream, followed by one bit for each pixel in the current group designating the bit value of that pixel in the current bit-plane;
   b. generating a new group; and
   c. splitting the original group into two, retaining pixels with a value "0" in the original group and placing pixels with a value "1" in the new group.
5. The method as recited in clause 4, further comprising decoding the compressed image file with a second processor to uncompress the image.
6. The method as recited in clause 5, wherein decoding the compressed image file comprises scanning and decoding the pixels from the most significant bit-plane to the least significant bit-plane, and for each bit-plane:
   a. obtaining the number of existing groups;
   b. setting the current group to be a first group;
   c. reading a bit from the bitstream;
   d. if the bit has a "0" value, then reading a second bit from the bitstream and setting the value to be the bit value for all pixels in the group in a current bit-plane;
   e. if the bit has a "1" value, then for each pixel in the group, one bit is read from the bitstream and set to be the bit value of that pixel in the current bit-plane, a new group is generated and the new group is split into the first group and the second group so that the pixels with the "0" value are in the first group and the pixels with the "1" value are in the second group; and
   f. repeating c-e until the end of the current bit-plane is reached.
7. The method as recited in clause 1, wherein the bit budget of each of the blocks is shared between the blocks.
8. The method as recited in clause 1, wherein the first processor is within a device selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone, a video player, a DVD writer/player, a Blu-ray® writer/player, a television and a home entertainment system.
9. An apparatus for processing an image, comprising:
   a. a first processor configured for processing pixels of an image; and
   b. programming executable on the first processor for,
      i. dividing the image into blocks;
      ii. setting a bit budget for each block;
      iii. converting pixels of each block into binary representations;
      iv. scanning and encoding the pixels from the most significant bit-plane to the least significant bit-plane; and
      v. generating a compressed image file of the encoded pixels.
10. The apparatus as recited in clause 9, further comprising memory coupled to the first processor, wherein the compressed image file is stored within the memory.
11. The apparatus as recited in clause 9, wherein programming is configured to scan and encode the pixels at each bit-plane comprises processing each existing group in the bit-plane, which further comprises:
    a. if the pixel values of the group all have the same value at the current bit-plane, writing a first bit value of "0" into a bitstream; and
    b. writing a second bit value into the bitstream designating the value of all the pixels in a current group.
12. The apparatus as recited in clause 11, wherein the programming is further configured to scan and encode the pixels by:
    a. if the pixel values of the group do not all have the same value at the current bit-plane, writing the first bit value of "1" into the bitstream, followed by one bit for each pixel in the current group designating the bit value of that pixel in the current bit-plane;
    b. generating a new group; and
    c. splitting the original group into two, retaining pixels with a value "0" in the original group and placing pixels with a value "1" in the new group.
13. The apparatus as recited in clause 12, further comprising:
    a. second programming executing on the first processor or a second processor; and
    b. the second programming configured to decode the compressed image file to uncompress the image.
14. The apparatus as recited in clause 13, wherein the decoder is further configured for scanning and decoding the pixels from the most significant bit-plane to the least significant bit-plane, and for each bit-plane:
    a. obtaining the number of existing groups;
    b. setting the current group to be a first group;
    c. reading a bit from the bitstream;
    d. if the bit has a "0" value, then reading a second bit from the bitstream and setting the value to be the bit value for all pixels in the group in a current bit-plane;
    e. if the bit has a "1" value, then for each pixel in the group, one bit is read from the bitstream and set to be the bit value of that pixel in the current bit-plane, a new group is generated and the new group is split into the first group and the second group so that the pixels with the "0" value are in the first group and the pixels with the "1" value are in the second group; and
    f. repeating c-e until the end of the current bit-plane is reached.
15. The apparatus as recited in clause 9, wherein the bit budget of each of the blocks is shared between the blocks.
16. The apparatus as recited in clause 9, wherein the apparatus is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone, a video player, a DVD writer/player, a Blu-ray® writer/player, a television and a home entertainment system.
17. An apparatus for processing an image with a sparse histogram, comprising:

a. first processing means configured for processing pixels of the image;
b. encoding means executable on the first processing means for:
   i. dividing the image into blocks;
   ii. setting a bit budget for each block;
   iii. converting pixels of each block into binary representations;
   iv. scanning and encoding the pixels from the most significant bit-plane to the least significant bit-plane; and
   v. generating a compressed image file of the encoded pixels; and
c. storage means coupled to the first processing means, wherein the compressed image file is stored within the storage means.

18. The apparatus as recited in clause 17, wherein encoding means is configured to scan and encode the pixels at each bit-plane comprises processing each existing group in the bit-plane, which further comprises:
a. if the pixel values of the group all have the same value at the current bit-plane, writing a first bit value of "0" into a bitstream; and
b. writing a second bit value into the bitstream designating the value of all the pixels in a current group.

19. The apparatus as recited in clause 18, wherein encoding means is configured to scan and encode the pixels comprising:
a. if the pixel values of the group do not all have the same value at the current bit-plane, writing the first bit value of "1" into the bitstream, followed by one bit for each pixel in the current group designating the bit value of that pixel in the current bit-plane;
b. generating a new group; and
c. splitting the original group into two, retaining pixels with a value "0" in the original group and placing pixels with a value "1" in the new group.

20. The apparatus as recited in clause 19, further comprising:
a. decoding means executable on the first processing means or a second processing means coupled to the first processing means; and
b. the decoding means configured to decode the compressed image file to uncompress the image.

21. The apparatus as recited in clause 20: wherein the decoding means comprises a decoder configured to decode the compressed image file by scanning and decoding the pixels from the most significant bit-plane to the least significant bit-plane, and for each bit-plane:
a. obtaining the number of existing groups;
b. setting the current group to be a first group;
c. reading a bit from the bitstream;
d. if the bit has a "0" value, then reading a second bit from the bitstream and setting the value to be the bit value for all pixels in the group in a current bit-plane;
e. if the bit has a "1" value, then for each pixel in the group, one bit is read from the bitstream and set to be the bit value of that pixel in the current bit-plane, a new group is generated and the new group is split into the first group and the second group so that the pixels with the "0" value are in the first group and the pixels with the "1" value are in the second group; and
f. repeating c-e until the end of the current bit-plane is reached.

22. The apparatus as recited in clause 17, wherein the bit budget of each of the blocks is shared between the blocks.

23. The apparatus as recited in clause 17, wherein the apparatus is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone, a video player, a DVD writer/player, a Blu-ray® writer/player, a television and a home entertainment system.

24. An apparatus for processing an image with a sparse histogram, comprising:
a. a first processor for processing pixels of the image;
b. an encoder executable on the first processor for:
   i. dividing the image into blocks;
   ii. setting a bit budget for each block;
   iii. converting pixels of each block into binary representations;
   iv. scanning and encoding the pixels from the most significant bit-plane to the least significant bit-plane; and
   v. generating a compressed image file of the encoded pixels; and
c. a storage device coupled to the first processing device, wherein the compressed image file is stored within the storage device.

25. The apparatus as recited in clause 24, wherein the encoder is configured to scan and encode the pixels comprising:
a. writing a first bit value into a bitstream designating that the pixel values all have the same value, if the pixel values all have the same value; and
b. writing a second bit value into the bitstream designating the value of all the pixels in a current group.

26. The apparatus as recited in clause 25, wherein the encoder is configured to scan and encode the pixels at each bit-plane comprising processing each existing group in the bit-plane, which further comprises:
a. if the pixel values of the group all have the same value at the current bit-plane, writing a first bit value of "0" into a bitstream;
b. writing a second bit value into the bitstream designating the value of all the pixels in a current group;
c. if the pixel values of the group do not all have the same value at the current bit-plane, writing the first bit value of "1" into the bitstream, followed by one bit for each pixel in the current group designating the bit value of that pixel in the current bit-plane;
d. generating a new group; and
e. splitting the original group into two, retaining pixels with a value "0" in the original group and placing pixels with a value "1" in the new group.

27. The apparatus as recited in clause 26, further comprising:
a. a decoder executable on the first processing means or a second processing means coupled to the first processing means; and
b. the decoder configured to decode the compressed image file to uncompress the image.

28. The apparatus as recited in clause 27 wherein the decoder is configured to decode the compressed image file by scanning and decoding the pixels from the most significant bit-plane to the least significant bit-plane, and for each bit-plane:
a. obtaining the number of existing groups;
b. setting the current group to be a first group;
c. reading a bit from the bitstream;
d. if the bit has a "0" value, then reading a second bit from the bitstream and setting the value to be the bit value for all pixels in the group in a current bit-plane;
e. if the bit has a "1" value, then for each pixel in the group, one bit is read from the bitstream and set to be the bit value of that pixel in the current bit-plane, a new group is generated and the new group is split into the first group and the second group so that the pixels with the "0" value are in the first group and the pixels with the "1" value are in the second group; and
f. repeating c-e until the end of the current bit-plane is reached.
29. The apparatus as recited in clause 24, wherein the bit budget of each of the blocks is shared between the blocks.
30. The apparatus as recited in clause 24, wherein the apparatus is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone, a video player, a DVD writer/player, a Blu-ray® writer/player, a television and a home entertainment system.
31. A network of devices comprising:
   a. an encoder device for encoding an image comprising:
      i. dividing the image into blocks;
      ii. setting a bit budget for each block;
      iii. converting pixels of each block into binary representations;
      iv. scanning and encoding the pixels from the most significant bit-plane to the least significant bit-plane; and
      v. generating a compressed image file of the encoded pixels; and
   b. a decoder device for decoding the compressed image file comprising scanning and decoding the pixels from the most significant bit-plane to the least significant bit-plane, and for each bit-plane:
      i. obtaining a number of existing groups;
      ii. setting a current group to be a first group;
      iii. reading a bit from a bitstream;
      iv. if the bit has a "0" value, then reading a second bit from the bitstream and setting the value to be the bit value for all pixels in the group in a current bit-plane;
      v. if the bit has a "1" value, then for each pixel in the group, one bit is read from the bitstream and set to be the bit value of that pixel in the current bit-plane, a new group is generated and the new group is split into the first group and the second group so that the pixels with the "0" value are in the first group and the pixels with the "1" value are in the second group; and
      vi. repeating iii-v until the end of the current bit-plane is reached.
32. The apparatus as recited in clause 31, wherein the encoder device is configured to scan and encode the pixels at each bit-plane comprising processing each existing group in the bit-plane, which further comprises:
   a. if the pixel values of the group all have the same value at the current bit-plane, writing a first bit value of "0" into a bitstream;
   b. writing a second bit value into the bitstream designating the value of all the pixels in a current group.
33. The apparatus as recited in clause 32, wherein the encoder device is configured to scan and encode the pixels comprising:
   a. if the pixel values of the group do not all have the same value at the current bit-plane, writing the first bit value of "1" into the bitstream, followed by one bit for each pixel in the current group designating the bit value of that pixel in the current bit-plane;
   b. generating a new group; and
   c. splitting the original group into two, retaining pixels with a value "0" in the original group and placing pixels with a value "1" in the new group.
34. The apparatus as recited in clause 33, wherein the bit budget of each of the blocks is shared between the blocks.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:
1. A method of processing an image, comprising:
   a. dividing the image into blocks using a first processor;
   b. setting a bit budget for each block;
   c. converting pixels of each block into binary representations;
   d. scanning and encoding the pixels from the most significant bit-plane to the least significant bit-plane, wherein scanning and encoding the pixels at each bit-plane comprises processing each existing group in the bit-plane, which further comprises:
      i. if the pixel values of the group all have the same value at the current bit-plane, writing a first bit value of "0" into a bitstream; and
      ii. writing a second bit value into the bitstream designating the value of all the pixels in a current group;
      iii. if the pixel values of the group do not all have the same value at the current bit-plane, writing the first bit value of "1" into the bitstream, followed by one bit for each pixel in the current group designating the bit value of that pixel in the current bit-plane;
      iv. generating a new group; and
      v. splitting the original group into two, retaining pixels with a value "0" in the original group and placing pixels with a value "1" in the new group; and
   e. generating a compressed image file of the encoded pixels and saving the compressed image file to memory coupled to the first processor.
2. The method as recited in claim 1, wherein the image comprises an image having a sparse histogram.
3. The method as recited in claim 1, further comprising decoding the compressed image file with a second processor to uncompress the image.
4. The method as recited in claim 3, wherein decoding the compressed image file comprises scanning and decoding the pixels from the most significant bit-plane to the least significant bit-plane, and for each bit-plane:
   a. obtaining the number of existing groups;
   b. setting the current group to be a first group;
   c. reading a bit from the bitstream;
   d. if the bit has a "0" value, then reading a second bit from the bitstream and setting the value to be the bit value for all pixels in the group in a current bit-plane;
   e. if the bit has a "1" value, then for each pixel in the group, one bit is read from the bitstream and set to be the bit value of that pixel in the current bit-plane, a new group is generated and the new group is split into the first group and the second group so that the pixels with the "0" value are in the first group and the pixels with the "1" value are in the second group; and
   f. repeating c-e until the end of the current bit-plane is reached.
5. The method as recited in claim 1, wherein the bit budget of each of the blocks is shared between the blocks.

6. The method as recited in claim 1, wherein the first processor is within a device selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone, a video player, a DVD writer/player, a Blu-ray® writer/player, a television and a home entertainment system.

7. An apparatus for processing an image, comprising:
   a. a first processor configured for processing pixels of an image; and
   b. programming executable on the first processor for,
      i. dividing the image into blocks;
      ii. setting a bit budget for each block;
      iii. converting pixels of each block into binary representations;
      iv. scanning and encoding the pixels from the most significant bit-plane to the least significant bit-plane, wherein scanning and encoding the pixels at each bit-plane comprises processing each existing group in the bit-plane, which further comprises:
         1) if the pixel values of the group all have the same value at the current bit-plane, writing a first bit value of "0" into a bitstream; and
         2) writing a second bit value into the bitstream designating the value of all the pixels in a current group;
         3) if the pixel values of the group do not all have the same value at the current bit-plane, writing the first bit value of "1" into the bitstream, followed by one bit for each pixel in the current group designating the bit value of that pixel in the current bit-plane;
         4) generating a new group; and
         5) splitting the original group into two, retaining pixels with a value "0" in the original group and placing pixels with a value "1" in the new group; and
      v. generating a compressed image file of the encoded pixels.

8. The apparatus as recited in claim 7, further comprising memory coupled to the first processor, wherein the compressed image file is stored within the memory.

9. The apparatus as recited in claim 7, further comprising:
   a. second programming executing on the first processor or a second processor; and
   b. the second programming configured to decode the compressed image file to uncompress the image.

10. The apparatus as recited in claim 9, wherein the decoder is further configured for scanning and decoding the pixels from the most significant bit-plane to the least significant bit-plane, and for each bit-plane:
    a. obtaining the number of existing groups;
    b. setting the current group to be a first group;
    c. reading a bit from the bitstream;
    d. if the bit has a "0" value, then reading a second bit from the bitstream and setting the value to be the bit value for all pixels in the group in a current bit-plane;
    e. if the bit has a "1" value, then for each pixel in the group, one bit is read from the bitstream and set to be the bit value of that pixel in the current bit-plane, a new group is generated and the new group is split into the first group and the second group so that the pixels with the "0" value are in the first group and the pixels with the "1" value are in the second group; and
    f. repeating c-e until the end of the current bit-plane is reached.

11. The apparatus as recited in claim 7, wherein the bit budget of each of the blocks is shared between the blocks.

12. The apparatus as recited in claim 7, wherein the apparatus is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone, a video player, a DVD writer/player, a Blu-ray® writer/player, a television and a home entertainment system.

13. An apparatus for processing an image with a sparse histogram, comprising:
    a. first processing means configured for processing pixels of the image;
    b. encoding means executable on the first processing means for:
       i. dividing the image into blocks;
       ii. setting a bit budget for each block;
       iii. converting pixels of each block into binary representations;
       iv. scanning and encoding the pixels from the most significant bit-plane to the least significant bit-plane, wherein scanning and encoding the pixels at each bit-plane comprises processing each existing group in the bit-plane, which further comprises:
          1) if the pixel values of the group all have the same value at the current bit-plane, writing a first bit value of "0" into a bitstream; and
          2) writing a second bit value into the bitstream designating the value of all the pixels in a current group;
          3) if the pixel values of the group do not all have the same value at the current bit-plane, writing the first bit value of "1" into the bitstream, followed by one bit for each pixel in the current group designating the bit value of that pixel in the current bit-plane;
          4) generating a new group; and
          5) splitting the original group into two, retaining pixels with a value "0" in the original group and placing pixels with a value "1" in the new group; and
       v. generating a compressed image file of the encoded pixels; and
    c. storage means coupled to the first processing means, wherein the compressed image file is stored within the storage means.

14. The apparatus as recited in claim 13, further comprising:
    a. decoding means executable on the first processing means or a second processing means coupled to the first processing means; and
    b. the decoding means configured to decode the compressed image file to uncompress the image.

15. The apparatus as recited in claim 14: wherein the decoding means comprises a decoder configured to decode the compressed image file by scanning and decoding the pixels from the most significant bit-plane to the least significant bit-plane, and for each bit-plane:
    a. obtaining the number of existing groups;
    b. setting the current group to be a first group;
    c. reading a bit from the bitstream;
    d. if the bit has a "0" value, then reading a second bit from the bitstream and setting the value to be the bit value for all pixels in the group in a current bit-plane;
    e. if the bit has a "1" value, then for each pixel in the group, one bit is read from the bitstream and set to be the bit value of that pixel in the current bit-plane, a new group is generated and the new group is split into the first group and the second group so that the pixels with the "0" value are in the first group and the pixels with the "1" value are in the second group; and f. repeating c-e until the end of the current bit-plane is reached.

16. The apparatus as recited in claim 13, wherein the bit budget of each of the blocks is shared between the blocks.

17. The apparatus as recited in claim 13, wherein the apparatus is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone, a video player, a DVD writer/player, a Blu-ray® writer/player, a television and a home entertainment system.

18. An apparatus for processing an image with a sparse histogram, comprising:
  a. a first processor for processing pixels of the image;
  b. an encoder executable on the first processor for:
      i. dividing the image into blocks;
      ii. setting a bit budget for each block;
      iii. converting pixels of each block into binary representations;
      iv. scanning and encoding the pixels from the most significant bit-plane to the least significant bit-plane, wherein scanning and encoding further comprises:
          1) writing a first bit value into a bitstream designating that the pixel values all have the same value, if the pixel values all have the same value;
          2) writing a second bit value into the bitstream designating the value of all the pixels in a current group;
          3) if the pixel values of the group all have the same value at the current bit-plane, writing a first bit value of "0" into a bitstream;
          4) writing a second bit value into the bitstream designating the value of all the pixels in a current group;
          5) if the pixel values of the group do not all have the same value at the current bit-plane, writing the first bit value of "1" into the bitstream, followed by one bit for each pixel in the current group designating the bit value of that pixel in the current bit-plane;
          6) generating a new group; and
          7) splitting the original group into two, retaining pixels with a value "0" in the original group and placing pixels with a value "1" in the new group; and
      v. generating a compressed image file of the encoded pixels; and
  c. a storage device coupled to the first processing device, wherein the compressed image file is stored within the storage device.

19. The apparatus as recited in claim 18, further comprising:
  a. a decoder executable on the first processing means or a second processing means coupled to the first processing means; and
  b. the decoder configured to decode the compressed image file to uncompress the image.

20. The apparatus as recited in claim 19 wherein the decoder is configured to decode the compressed image file by scanning and decoding the pixels from the most significant bit-plane to the least significant bit-plane, and for each bit-plane:
  a. obtaining the number of existing groups;
  b. setting the current group to be a first group;
  c. reading a bit from the bitstream;
  d. if the bit has a "0" value, then reading a second bit from the bitstream and setting the value to be the bit value for all pixels in the group in a current bit-plane;
  e. if the bit has a "1" value, then for each pixel in the group, one bit is read from the bitstream and set to be the bit value of that pixel in the current bit-plane, a new group is generated and the new group is split into the first group and the second group so that the pixels with the "0" value are in the first group and the pixels with the "1" value are in the second group; and
  f. repeating c-e until the end of the current bit-plane is reached.

21. The apparatus as recited in claim 18, wherein the bit budget of each of the blocks is shared between the blocks.

22. The apparatus as recited in claim 18, wherein the apparatus is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone, a video player, a DVD writer/player, a Blu-ray® writer/player, a television and a home entertainment system.

* * * * *